UNITED STATES PATENT OFFICE.

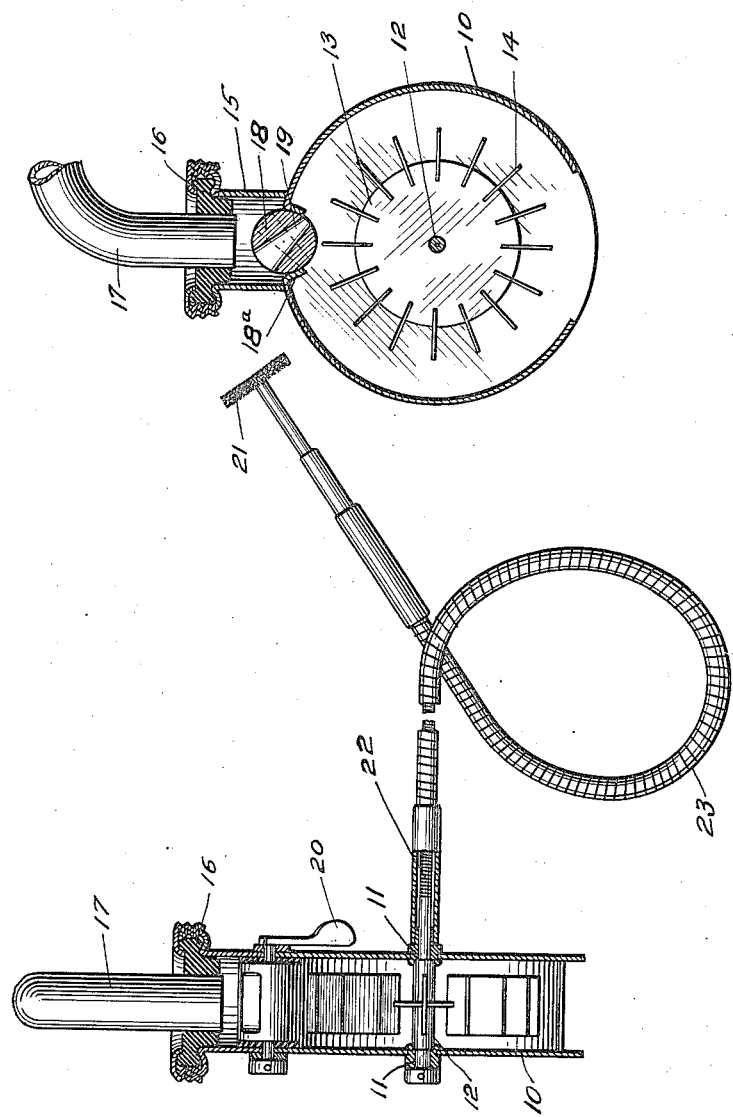

HORACE E. FRAME, OF BROOKLYN, NEW YORK.

WATER-MOTOR.

1,228,897. Specification of Letters Patent. Patented June 5, 1917.

Application filed July 31, 1915. Serial No. 42,875.

*To all whom it may concern:*

Be it known that I, HORACE E. FRAME, a citizen of the United States, and a resident of the borough of Brooklyn, city and State of New York, have invented certain new and useful Improvements in Water-Motors, of which the following is a description.

My invention relates to water motors, and particularly to relatively small portable motors which may conveniently be attached to any source of water or other fluid supply, such, for instance, as an ordinary faucet.

The object of my invention is to provide such a water motor which shall be simple and inexpensive in construction and convenient, reliable, and efficient in operation.

I have shown my improved motor as applied to a rotary tooth-brush, but it is to be understood that this is but one of the many uses to which it may be put.

In the drawing,

Figure 1 is a sectional view of my improved motor showing a rotary tooth-brush and its flexible shaft connected thereto; and Fig. 2 is a sectional view of the motor taken at right-angles to the section shown in Fig. 1.

Referring to the drawing, 10 indicates the casing or housing, which is preferably circular, as shown. Within this casing and mounted in the bearings 11 is the rotary shaft 12, to which is secured the disk 13. This disk 13 is provided about its periphery with a plurality of blades or flanges 14, as clearly shown in Fig. 2. The disk and shaft constitute the rotary element of my improved motor.

At the top of the casing 10 there is provided the neck portion 15, in which is secured, in any suitable manner, a resilient washer, such as shown at 16, whereby the motor may be conveniently attached to any suitable source of fluid supply, such as the faucet 17.

The material of the casing 10 is preferably turned in at the top, as shown at 18[a], to form a bearing for the angularly adjustable member 18, which is provided with an opening 19, constituting a nozzle. In the position shown in Fig. 2, this nozzle directs the fluid toward the right, against the blades 14, thus causing a clockwise rotation of the rotary element. If it is desired to cause the rotation of the rotary element in the opposite direction, it is merely necessary to adjust the member 18 so that the fluid is projected against the blades 14 in the opposite direction. In order to facilitate the adjustment of the member 18, I provide a finger piece, such as is shown at 20, located without the casing so that it may readily be manipulated when desired.

The power from this motor may be applied to any member which it is desired to operate. As herein shown, I have utilized the motor to rotate the tooth-brush 21. The power from the motor may be transmitted to the tooth-brush in any suitable way, as, for instance, by the flexible shafting 22, which is preferably inclosed in a casing 23.

I find that my improved motor is of particular advantage when applied to drive a rotary tooth-brush, since in the use of such a brush the direction of rotation should always be such that the bristles move away from the gums, rather than toward the gums, and it is, therefore, frequently necessary in using such a tooth-brush, to reverse the direction of rotation thereof.

The fact that my improved motor consists of comparatively few parts and is, therefore, light in weight, enables it to be very easily moved from one place to another and applied to any convenient faucet, or other source of fluid supply. It is also apparent that, because of the simple construction of my motor, it is very reliable in operation.

While I have illustrated and described but one embodiment of my invention, it is to be understood that I do not wish to limit myself to this or any particular embodiment, since obviously many changes may be made therein by those skilled in the art without departing from the spirit of my invention.

What I claim is:

1. In a device of the character described, a substantially cylindrical casing, the material of which is turned in at the top to form a bearing, a rotary element mounted within said casing and provided about its periphery with a plurality of blades, an angularly adjustable member mounted in said bearing and provided with a nozzle for directing fluid against said blades to cause the rotation of said rotary element, and means for adjusting said nozzle to thereby vary the direction of rotation of said rotary element.

2. In a device of the character described, a substantially cylindrical casing, the material of which is turned in at the top to form a bearing, a rotary element mounted within said casing and provided about its periphery with a plurality of blades, an angularly adjustable member mounted in said bearing and provided with a nozzle for directing fluid against said blades to cause the rotation of said rotary element, means for adjusting said nozzle to thereby vary the direction of rotation of said rotary element, and a neck portion secured to the top of the casing for inclosing said angularly adjustable member, said neck portion being provided with means for detachably securing the casing to a source of fluid supply.

In testimony whereof I have signed this specification in the presence of two subscribing witnesses.

HORACE E. FRAME.

Witnesses:
ANNA MARIE WALL,
M. M. RIEMANN.